(12) United States Patent
de Lira et al.

(10) Patent No.: US 8,877,088 B2
(45) Date of Patent: Nov. 4, 2014

(54) MONO- AND BI-COMPONENT FORMULATIONS IN THE FORM OF A PAINT, VARNISH AND WATER-EMULSIFIED BASE, PROCESSES FOR PREPARING THE SAME AND APPLICATIONS THEREOF

(75) Inventors: Francisco Rodrigues de Lira, São Paulo (BR); Hildebrando Lucas Santos, São Paulo (BR)

(73) Assignee: Roma Comercial Quimica Ltda., Belo Horizonte MG (BR)

( * ) Notice: Subject to any disclaimer, the term of this patent is extended or adjusted under 35 U.S.C. 154(b) by 476 days.

(21) Appl. No.: 13/061,260

(22) PCT Filed: Aug. 28, 2009

(86) PCT No.: PCT/BR2009/000264
§ 371 (c)(1),
(2), (4) Date: Jul. 15, 2011

(87) PCT Pub. No.: WO2010/022488
PCT Pub. Date: Mar. 4, 2010

(65) Prior Publication Data
US 2012/0004346 A1    Jan. 5, 2012

(30) Foreign Application Priority Data

Aug. 29, 2008 (BR) ..................................... 0803689

(51) Int. Cl.
| | |
|---|---|
| *C09K 13/08* | (2006.01) |
| *C09D 5/16* | (2006.01) |
| *C09D 5/14* | (2006.01) |
| *C09D 175/00* | (2006.01) |

(52) U.S. Cl.
CPC ............ *C09D 175/00* (2013.01); *C09D 5/1637* (2013.01); *C09D 5/14* (2013.01); *C09D 5/1687* (2013.01)

USPC ... 252/79.3; 252/79.1; 428/423.1; 435/262.5; 514/2.4

(58) Field of Classification Search
None
See application file for complete search history.

(56) References Cited

U.S. PATENT DOCUMENTS

| | | | | |
|---|---|---|---|---|
| 5,427,787 | A | * | 6/1995 | Yang et al. ................ 424/93.461 |
| 6,013,724 | A | * | 1/2000 | Mizutani et al. .............. 524/588 |
| 2006/0141003 | A1 | * | 6/2006 | McDaniel ..................... 424/422 |
| 2006/0210807 | A1 | | 9/2006 | Miller |
| 2007/0128151 | A1 | * | 6/2007 | Elder et al. ................. 424/78.09 |

FOREIGN PATENT DOCUMENTS

| | | |
|---|---|---|
| EP | 0 438 857 A1 | 7/1991 |
| WO | WO 03/039256 A1 | 5/2003 |

OTHER PUBLICATIONS

PCT written opinion of the international searching authority, PCT/BR2009/000264, Feb. 28, 2011.*
International Search Report and Written Opinion for Application No. PCT/BR2009/000264 dated Dec. 2, 2009.

* cited by examiner

*Primary Examiner* — Lan Vinh
*Assistant Examiner* — Jiong-Ping Lu
(74) *Attorney, Agent, or Firm* — Alston & Bird LLP

(57) ABSTRACT

The invention relates to formulations with anti-graffiti-scrawling, self-cleaning, anti-incrustation and/or nonstick properties. The formulations are made from synthetic and natural polymers and in a system that may be either mono- or bi-component. In addition, the invention also relates to the application of said formulations to objects, monuments, constructions and means of transport, imparting protection thereto. Further, the present invention relates to processes for preparing said formulations.

7 Claims, 5 Drawing Sheets

MONO- AND BI-COMPONENT FORMULATIONS IN THE FORM OF A PAINT, VARNISH AND WATER-EMULSIFIED BASE, PROCESSES FOR PREPARING THE SAME AND APPLICATIONS THEREOF

SUMMARY OF THE INVENTION

The invention relates to formulations with anti-graffiti-scrawling, self-cleaning, anti-incrustation and/or nonstick properties. The formulations are made from synthetic and natural polymers and in a system that may be either mono- or bi-component. Commercially, these formulations can be presented in the form of paint, varnish or water-emulsified base.

In addition, the invention also relates to the application of said formulations to objects, monuments, constructions and means of transport, imparting protection thereto.

Further, the present invention relates to processes for preparing said formulations.

BACKGROUND OF THE INVENTION

Graffiti-scrawling has proved to be a serious problem for preservation of public historic buildings, as well as for residential and commercial buildings. This yet-unsolved problem indiscriminately affects the architecture in cities with scrawling that deprive them from beauty, stains, depreciates and damages walls, historic heritage, transport systems, viaducts and other constructions. However, more than merely an esthetic problem, graffiti-scrawling damages the real estate affected, causing financial damages to the Government and/or owners thereof, who have to spend capital for maintenance and restoration of the objects and places damaged by such scrawling.

So far, the market did not make available any formulation that could be resistant to graffiti-scrawling. Once an object had been graffiti-stained, it would not be easy to remove such scrawling, unless one used solvents, sand jets and/or other highly abrasive processes, and it would further be necessary to paint the affected object again.

With regard to the formulations available on the market, there are those intended for imparting protection against graffiti-scrawling on surfaces. However, they are merely palliatives as far as the preservation of the objects is concerned, since the removal of such applied paints is difficult, laborious and expensive, because the cleaning requires the use of chemical products, such as organic solvents and chemical surfactants, which not only attack the environment, but also affect the human health. Besides, with the successive cleanings of the object, the coating film that imparts the desired protection loses its efficacy.

There are still provisional coatings, which do not need solvents for cleaning, only hot water or steam being used for this purpose. However, such coating is removed with the graffiti-paint, for which reason a new application thereof becomes necessary, which generates labor costs for reapplication of such coating, as well as damage to the environment, since harmful raw materials are employed. In addition to all the foregoing, the use thereof is limited, that is, it can only be applied to porous surfaces like stones or apparent concrete.

Further with regard to the anti-incrustation property, it is pointed out that the materials that are commercially available and that exhibit such activity contain heavy metals and/or other toxic substances that bring risks for the marine ecosystem, as well as to the user himself, depending on the case.

Document WO 1991/003522 discloses a cleaning formulation that removes graffiti-scrawling, paints and other coatings, if any, from surfaces. This formulation comprises N-methylpyrrolidone; propylene carbonate; hydroxyl propyl cellulose thixotropic thickening agent; an ingredient selected from the group consisting of diethylene glycol monoethyl ether acetate, dipropylene glycol monomethyl ether acetate, dipropylene glycol methyl ether, diethylene glycol ethyl ether and isocetyl alcohol; and a surfactant.

Document PI 9202375-4 discloses a method for protecting surfaces against graffiti-scrawling and cleaning the previously protected surfaces, the method including previous protection of a surface or frontage whatever against graffiti-scrawling by applying enamel or varnish of bi-component aliphatic polyurethane, by application of a mixture of aromatic solvents, such as acetone, thinner and others, with alkaline products such as potassium hydroxide, sodium hydroxide, detergents and soaps.

Document WO 98/21282 discloses a paint composition that includes from about 1 to about 41% by volume of a silicone caulking, from about 1 to about 41% by volume of mineral spirits and from about 18 to about 98% by volume of a paint. The paint composition provides good repellency against graffiti and is not sacrificial in nature.

Document WO 02/16521 discloses a paint containing specific enzymes that remain inactive when applied to a surface coating of the paint formulation until specifically activated through an applying solution, applied subsequently to facilitate the removal of the surface coating. When the solution is applied to the surface coating, the enzymes catalyze the hydrolysis of the binder in the paint or surface coating, for example, by cleaving the ester bonds at positions 1 and 3 of the triglyceride molecules. This enables removal of the coating without damaging or affecting the underlying surface.

Document EP 1529801 discloses a multilayer film (A) comprising a surface layer (L1) and underlying layer (s) (L2), all of them formed from organic polymer (s) and free complexing/chelating agents and mineral fillers, (L1) containing agent (s) (I) to provide removal of the layer by means of a rinsing liquid (B). It also discloses methods of preparing (A), which involves: (1) applying an aqueous emulsion of the polymer to the surface to form a film through coalescence (specifically at room temperature or at the temperature of the use surface), optionally with drying and impregnation with (I); or (2) adding (I) to at least one of two or more separation portions of the polymer emulsion and successive applications of the portions to the surface.

Unlike what is disclosed in the prior art, one of the differentiating aspects of the presently claimed anti-graffiti, self-cleaning and/or non-sticking formulations, as compared with the formulations known from the prior art, is the non-use of a solvent for removing the graffiti-scrawl applied to the object that has been stained therewith.

DESCRIPTION OF THE INVENTION

The present invention relates to formulations that provide anti-graffiti, anti-incrustation, self-cleaning and/or nonstick protection, which can be applied to different and varied types of surfaces like: metal, wood, plastic, non-metals, concretes, masonry, stones and to cementitious, ceramic and chemical coatings like textures and synthetic paints. The surfaces that have the formulation of the present invention applied thereto enable one to remove the graffiti, for instance, with water and soap. The benefits of this formulation lie in the ecologically correct cleaning, since it does not make use of solvents, heavy metals and/or other toxic substance, nor does it employ chemical surfactants and alkaline products; in the longer durability of the film applied to the surface; in the more rapid and efficient cleaning; and in the non-aggression to the surface of the object.

In addition, one has found that the properties imparted by the formulations of the present invention, particularly with regard to the use thereof on any material in contact with fresh water or salt water, crafts and/or means of transport selected from—but not limited to—boats, ships, catamarans, bulk carriers, ferry boats, cargo ships, floats, dredges, barges, tankers, rafts, sea platform suppliers, motor-boats, towboats, pushing boats, container carriers, derrick boats/cranes, submarines, etc., providing, in addition to the anti-graffiti property, non-stickness, which consequently provides the significant inhibition of adhesion of sea and/or river incrustations, as well as other impregnation types, which, in the initial phase of impregnation, behave as an adhesive larva sticking to the surface to develop. The removal of these incrustations from the surfaces of said means of transport and materials dispenses with the employ of both solvents and/or invasive mechanical removals. It is thus possible to remove these impregnations on means of transport that move at a determined speed merely with the friction of the water. Another advantage provided by the present invention as compared with the performance of other anti-incrustation products found on the market, the so-called "anti-fouling", is that it does not self-delaminate, and also, since it does not undergoes a "sacrifice" in the chemical and/or mechanical (spatula) process of removing the impregnations, it provides a painting that, besides being more ecological, lasts much longer. Therefore, there are the advantages provided by the present invention, among others. In addition to these advantages, the conventional paints available on the market, in the anti-incrustation process, delaminates and disperse heavy metals in water, such as TBT, which are used to prevent partially incrustations on the means of transport.

The cleaning system of the formulations of the present invention is analogue to that of leaves and plants, this system consisting of: self-cleaning capability for soot and dirt to which they are exposed and which, as a result, are deposited onto the surface during periods without rain. In this case, the force of rain water alone is sufficient to carry out the cleaning.

Considering that the monuments, constructions, vehicles and objects exposed to weather action are equally exposed to soot and dirt particles, one observes that the conventional paints that are deposited onto the surface of said objects along the time change become a fertile soil for the proliferation of microorganisms such as fungi, bacteria, slime, moss and/or algae, and result in dirty, dark and damaged surfaces. A similar situation is observed in the materials in contact with fresh water or salt water, which are subject to corrosion, encrustation, impregnation and/or other attacks by external agents against their contact surface, including the surface of contact with water or with the environment of water-borne means of transport and/or crafts selected—but not limited to, boats, ships, catamarans, bulk carriers, ferry boats, cargo ships, floats, dredges, barges, tankers, rafts, sea platform suppliers, motor-boats, towboats, pushing boats, container carriers, derrick boats/cranes, submarines, etc.

As to the formulations of the present invention, they have high resistance to chemicals, weather, photodegradation and dirt impregnation. They are indicated and used not only for protection against graffiti-scrawling, but also for protection against chemical products, acidic rains, dirt in general, in environments that are chemically aggressive or not.

The formulations of the present invention can be made commercially available in the form of pain, varnish and water-emulsified solvent base and can be applied to:

means of transport like: trains, subways, vehicles in general (such as motorcycles, cars, buses, bicycles, etc.), plains, crafts and/or water-borne means of transport selected—but not limited to, boats, ships, catamarans, bulk carriers, ferry boats, cargo ships, floats, dredges, barges, tankers, rafts, sea platform suppliers, motor-boats, towboats, pushing boats, container carriers, derrick boats/cranes, submarines, etc.;

constructions like: frontages, walls, stations, buildings, shopping centers, school buildings, hospitals, monuments and historic heritage, chemical and pharmaceutical laboratories, chemical, petrochemical and mining industries, commercial and industrial kitchens and places where there is a need for asepsis and protection against graffiti, weather action and chemical aggression;

objects like: refrigerating chamber, containers, public toilets, industrial floors, household utensils, metallic and wooden furniture, public telephone booths, among others.

BRIEF DESCRIPTION OF THE DRAWINGS

In FIG. 1, the streams are represented as follows:
C1 represents the polymer containing a hydroxyl group;
C2 represents isocyanate;
C3 represents the reaction stabilizing agent (acetyl/benzoyl chloride);
C4 is the mixture of solvents;
C5 is the rheological additive;
C6 is the dispersing agent;
C7 is the antifoaming or de-aerating agent;
C8 is the wetting agent;
C9 is the mixture of the mineral fillers;
C10 is the pigment paste;
C11 is the rest of the solvent passed through the ball mill;
C12 is the fluorinated polymer PTFE;
C13 is the hydroxyl alkyl poly dimethylsyloxane resin (which may be wholly or partly substituted with functional acrylic polydimethylsyloxane or modified polyether;
C14 is fluorochemical;
C15 is the anti-incrustation, antifungal agent, and inhibitor of the formation of moss, slime and algae;
C16 is the frosting agent (optional);
C17 is the ultraviolet protection agent (optional);
C18 is the pre-polymer (PHASE 1);
C19 is the polyfunctional isocyanate.

The pieces of equipment represented by numbers (1), (2), (3), (4) and (5) are: reactor provided with stirrer, tank provided with a disperser, ball mill, hermetically closed tank with inert atmosphere and container suitable for commercialization, respectively.

Figure 2:
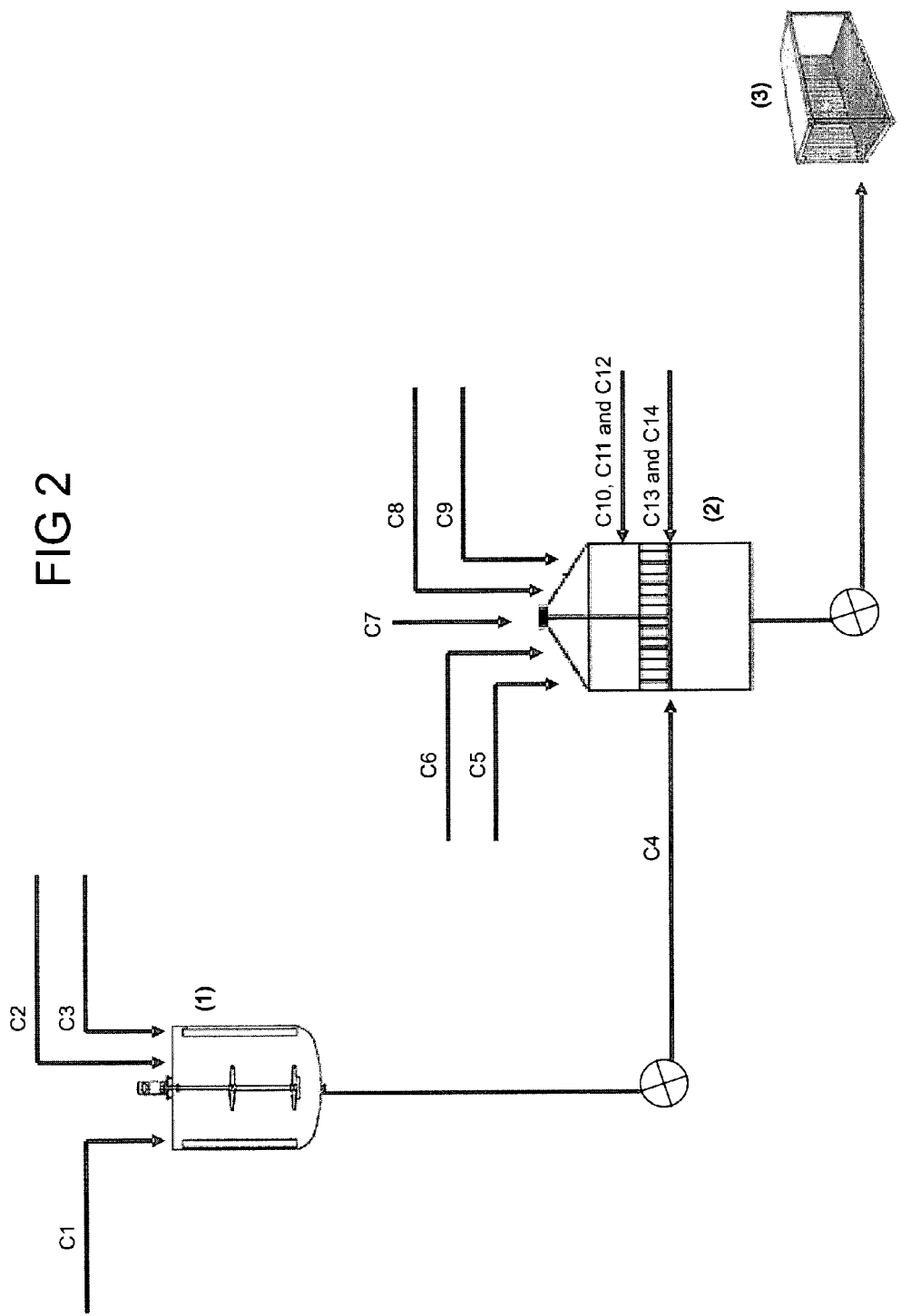

FIG. 2 shows a flow chart of a process for preparing the varnish formulation (mono-component).

In FIG. 2, the streams are as represented below:
C1 represents the polymer containing hydroxyl group;
C2 represents isocyanate;
C3 represents the reaction stabilizing agent (acetyl/benzoyl chloride);
C4 is the pre-polymer;
C5 is the mixture of solvents;
C6 is the anti-foaming or de-aerating agent;
C7 is the wetting agent;
C8 is the fluorinated polymer PTFE;

C9 is the hydroxyl alkyl poly-dimetylsyloxane resin (which may be wholly or partly substituted with functional acrylic polydimethylsyloxane or modified polyether;

C10 is the fluorochemical;

C11 is the anti-incrustation, antifungal agent, and inhibitor of the formation of moss, slime and algae;

C12 is the hygroscopic agent;

C13 is the frosting agent (optional);

C14 is the ultraviolet protection agent (optional).

The pieces of equipment represented by numbers (1), (2) and (3) are: reactor provided with a stirrer, mixer with inert atmosphere and container suitable for commercialization, respectively.

Figure 3:
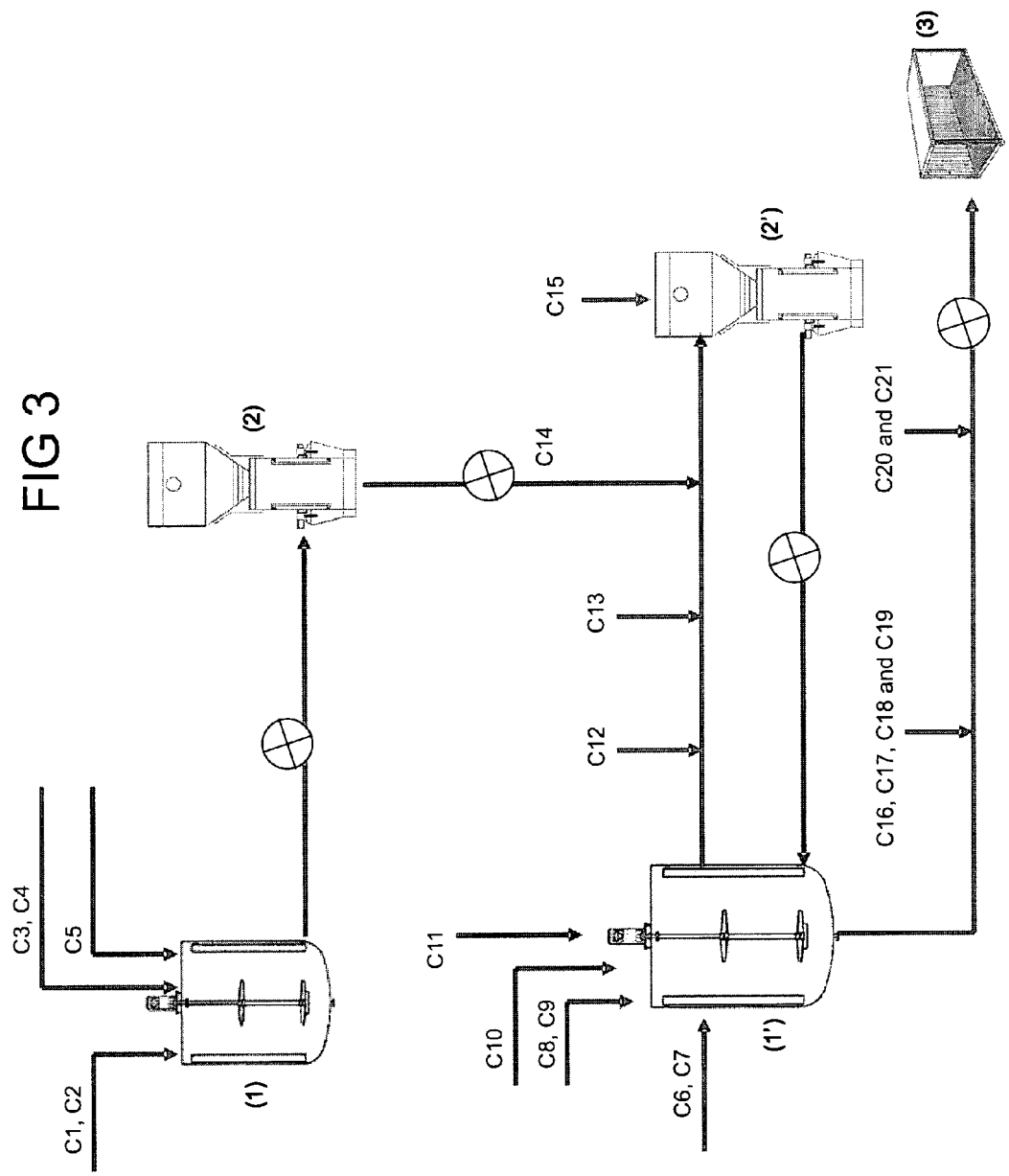

FIG. 3 shows a flow chart of a process for preparing the bi-component formulation.

In FIG. 3, the streams are as represented below:

C1 represents the pigment;

C2 represents the solvent;

C3 represents the dispersing agent;

C4 is the anti-foaming or de-aerating agent;

C5 is the grinding agent;

C6 is the added part of the mixture of solvents;

C7 is the rheological additive;

C8 is the dispersing agent;

C9 is the anti-foaming or de-aerating agent;

C10 is the wetting agent;

C11 is the mixture of the mineral fillers;

C12 is the polyester resin;

C13 is the plasticizer;

C14 is the pigment paste;

C15 is the rest of the solvent passed through the ball mill;

C16 is the hydroxyl alkyl polydimethylsyloxane resin (which may be wholly or partly substituted with functional acrylic polydimethylsyloxane or modified polyether);

C17 is the fluorinated polymer PTFE;

C18 is the fluorochemical;

C19 is the anti-incrustation, antifungal agent, and inhibitor of the formation of moss, slime and algae;

C20 is the frosting agent (optional);

C21 is the ultraviolet protection agent (optional).

The pieces of equipment represented by numbers (1) and (1'), (2) and (2') and (3) are: tank provided with a disperser, a ball mill and a container suitable for commercialization, respectively.

Figure 4:
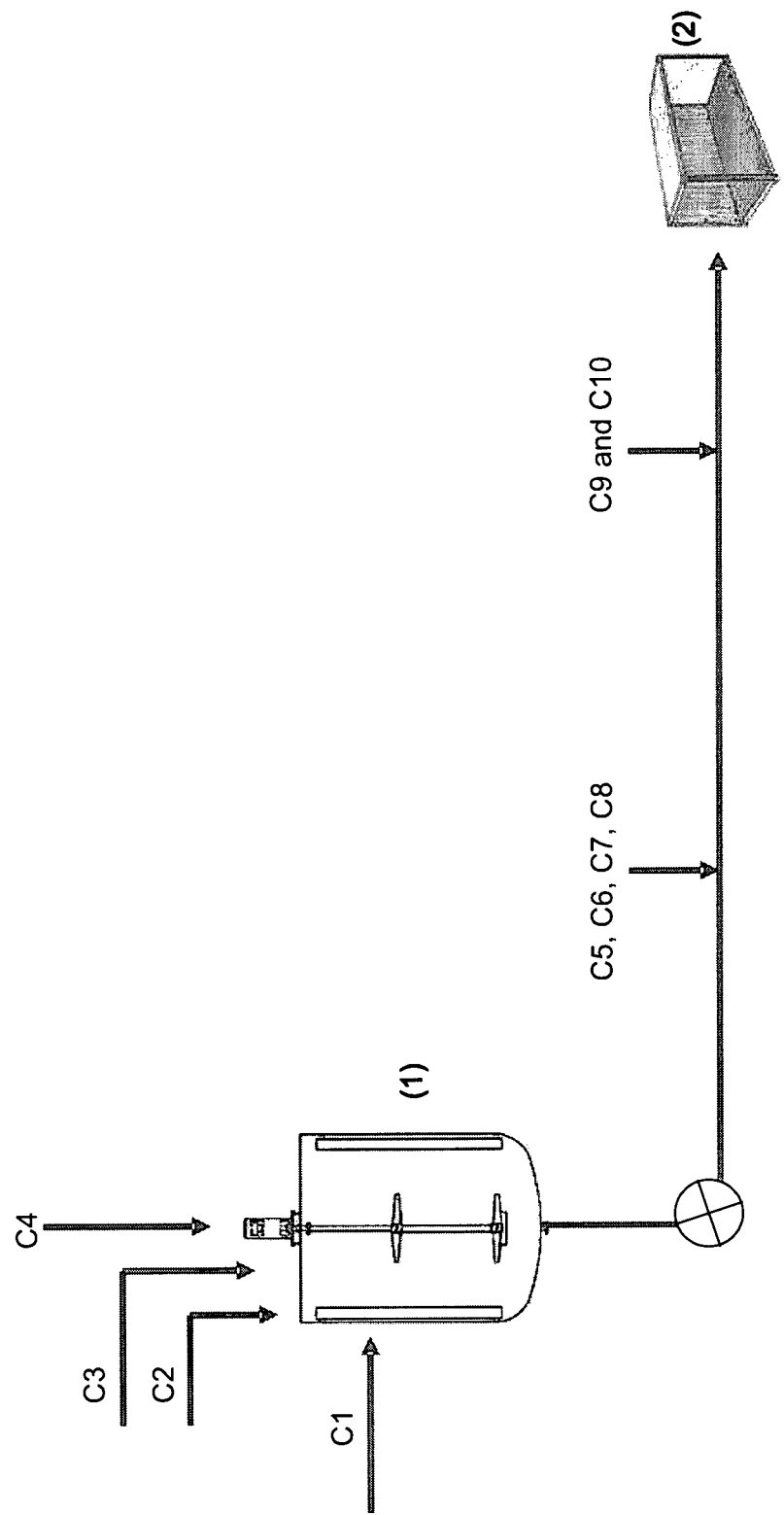

FIG. 4 shows a flow chart of a process for preparing the varnish (bi-component) formulation.

In FIG. 4, the streams are as represented below:

C1 is the added part of the mixture of solvents;

C2 is the anti-foaming or de-aerating agent;

C3 is the wetting agent;

C4 is the polyester resin;

C5 is the hydroxyl alkyl poly-dimetylsyloxane resin (which may be wholly or partly substituted with functional acrylic polydimethylsyloxane or modified polyether);

C6 is the fluorinated polymer PTFE;

C7 is the fluorochemical;

C8 is the anti-foaming, antifungal agent, and inhibitor of the formation of moss, slime and algae;

C9 is the frosting agent (optional);

C10 is the ultraviolet protection agent (optional).

The pieces of equipment represented by numbers (1) and (2) are: tank provided with a disperser and container suitable for commercialization, respectively.

Figure 5:
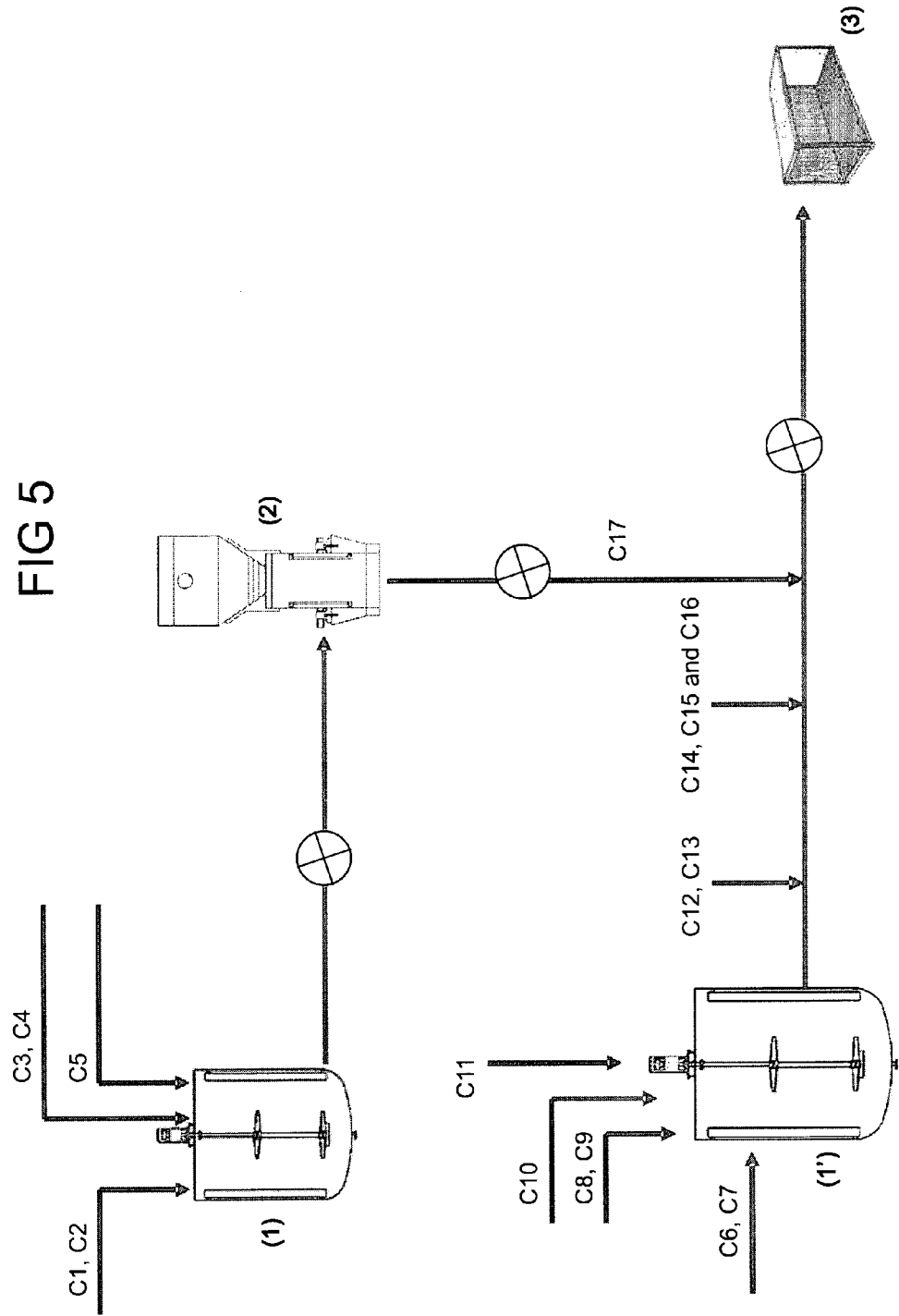

FIG. 5 shows a flow chart of a process for preparing the bi-component formulation as a water-emulsified base.

In FIG. 5, the streams are as represented below:

C1 represents the added pigment;

C2 represents the dissolution carrier;

C3 represents the dispersing agent;

C4 is the anti-foaming or de-aerating agent;

C5 is the grinding agent;

C6 is the dissolution carrier;

C7 is the rheological additive;

C8 is the dispersing agent;

C9 is the anti-foaming or de-aerating agent;

C10 is the surfactant;

C11 is the mixture of the mineral fillers;

C12 is the dispersion of a urethane polymer;

C13 is the acrylic resin emulsion;

C14 is the emulsion of a hydroxyl alkyl poly-dimetylsyloxane resin;

C15 is the fluorochemical;

C16 is the anti-foaming, antifungal agent, which inhibits the formation of moss, slime and algae;

C17 is the pigment paste;

The pieces of equipment represented by numbers (1) and (1'), (2) and (2') and (3) are: tank provided with a disperser, ball mill and container suitable for commercialization, respectively.

DETAILED DESCRIPTION OF THE INVENTION

In the face of the critical scenario referring to the pollution caused by graffiti-scrawling, the present invention provides formulations that, with their antigraffiti, self-cleaning and/or nonstick properties, provides easy removal of graffiti-scrwaling, as well as of impregnating materials, made with spray, latex, wax chalk, brush pen, enamels, greases, dusts, natural, chemical and marine incrusting materials, among others, and still reduce the impregnation of dirt in general and/or microorganisms substantially.

The objective of the present invention is to aid in preserving public heritage or any other type of construction, means of transport and objects. By virtue of their mechanism of self-cleaning actuation similar to that of leaves, said formulations are capable of loosening dirt particles like dust and soot, which are deposited onto the surface of the object to which the formulations have been applied, without the need to use solvents. This cleaning can be made in various ways, among which are: dry-removal (using paper, sponge, newspaper, flannel or any other type of object) by employing only water and soap, pressurized water jets. The rapid and easy removal of graffiti-scrawls without the need to use a solvent promotes the cleaning of the object without any damage to the object to which the formulation has been applied.

The formulations of the present invention exhibit the following characteristics:

chemical resistance (against solvents) and UV radiation;

resistance to solvents, acids and base;

resistance to abrasion via liquids (washing higher than 2500 cycles in test);

inhibition of adhesion of the graffiti-scrawls, as well as of impregnating materials, like spray, latex, wax chalk, brush pen, enamels, greases, dusts, incrustation materials, among others;

waterproof, hydrophobic and oilphobic properties imparted to the surface;

imparts self-cleaning property to the treated surface;

substantial reduction of microorganism formation, brought about by the impermeability, self-cleaning and fungicidal action imparted to the surface of the object;

easy removal and absence of damage to the surface treated, since they are used without the need for solvents for cleaning.

The properties of the formulations of the present invention are obtained due to the presence of certain components, namely:

Self-Cleaning Property

The self-cleaning property of the formulation of the present patent application is obtained by adding a fluorochemical polymer, which is a fluorinated polymer that modifies the molecular structure of the surface, reducing the area of contact of the dirt particle with the protected surface, as well as reducing the coefficient of friction between them. The reduction of the friction coefficient on the film provides a significant increase in the speed of the water droplet, dragging the soot and dust particles deposited onto the surface.

Property of Removing Graffiti-Scrawls with Water and Soap

The property of removing graffiti-scrawls with water and soap of the formulation of the present application is obtained by adding 1 to 3% hydroxyl alkyl poly-dimetylsyloxane resin (which may be wholly or partly substituted with functional acrylic polydimethylsyloxane or modified polyether, and 3 to 5% of a polytetrafluorethylene (PTFE) fluorinate.

UV Resistance Property

This property is improved in the formulation if an ultraviolet filtration agent is added.

Property of Anti-Incrustation, Antifungal and Inhibition of the Formation of Moss, Slime and Algae:

The Property of anti-incrustation, antifungal and inhibition of the formation of moss, slime and algae is obtained by gradual release of 2 to 3% by weight of the product commercially available as MX 500®, which contains in its composition plant extracts, isothiazolone, mineral oils, cationic surfactants and glycols. This property results from the joint action of MX 500® with the PTFE polymer, which imparts "antiadhesion" of microorganisms onto the film formed on the object to which the formulation has been applied and provide an efficient anti-incrustation, antifungal and moss/slime/algae inhibiting action of the formulation.

Formulation

The formulations of the present invention are made from synthetic and natural polymers in mono- and bi-component systems and may contain a solvent of water as a carrier.

Said formulations comprise the following constituents:
film forming agent (curing agent): polyester derived from PET (polyethylene therephthalate), 2,4 toluene di-isocyanate, which may be substituted with 2,6 toluene di-isocyanate, and/or a mixture thereof or hydrophilic polyisocyanate;

surface activity additive: hydroxyl alkyl poly-dimetylsyloxane resin, modified hydroxyl alkyl poly-dimetylsyloxane resin (which may be wholly or partly substituted with functional acrylic polydimethylsyloxane or modified polyether) and fluorinated polymer of PTFE: Fluorinate;

grinding carrier: plant oil, short-chain alquidic resin in plant oil, hydroxylated acrylic resin or carboxylated resin;

plasticizer: castor oil, chlorinated paraffin and/or mixture thereof;

rheological agent: organically modified clays, preferably: bentone;

mineral fillers: (calcium and/or magnesium) carbonates, talc and silicates, optionally subjected to previous treatment for removal of moisture and/or mixture thereof;

solvents with moisture contents ≤0.2%, selected from: aromatic hydrocarbons (xylenes and toluenes), ketonic (methylethylketone (MEK), methylethylbutyl ketone (MEBK), acetates (ethylene and buthylglycol acetate) and esters (ethyl and butyl esters), and/or mixtures thereof;

ultraviolet protection agent: 2(2-hydroxy-3,5-bis(1,1-dimethylbenzyl) phenyl)benzotriazole, commercially available as TINUVIN®234;

reaction stabilizer: acetyl chloride, benzoyl chloride and/or mixtures thereof;

anti-foaming and de-aerating agent: vinyl polymer, mineral oil or silicone;

dispersing agent: mineral oil derivative, sodium polyacrylate or polyacrylic acid sodic salt;

wetting agent: multifunctional silicone, mineral oil or sodium polyacrylate;

anti-incrustation, antifungal and moss, slime and algae inhibiting agent: a product commercially available (MX 500®) which contains plant extracts, iso-thiazolone, mineral oils, cationic surfactants and glycols in its formulation;

self-cleaning property imparting agent: fluorochemical;

surfactant: acetylene glycol;

dissolution carrier: deionized water.

Optionally, the formulations of the present invention may also comprise:
hygroscopic agent: polyfunctional isocyanate;
frosting agent: pyrogenated silicas and polyethylene waxes;
synthetic, organic and metallic pigments known from the art.

The present invention further relates to processes for preparing the mono-component and bi-component formulations. The individual processes for obtaining the formulations in question are described hereinafter.

Figure 1:
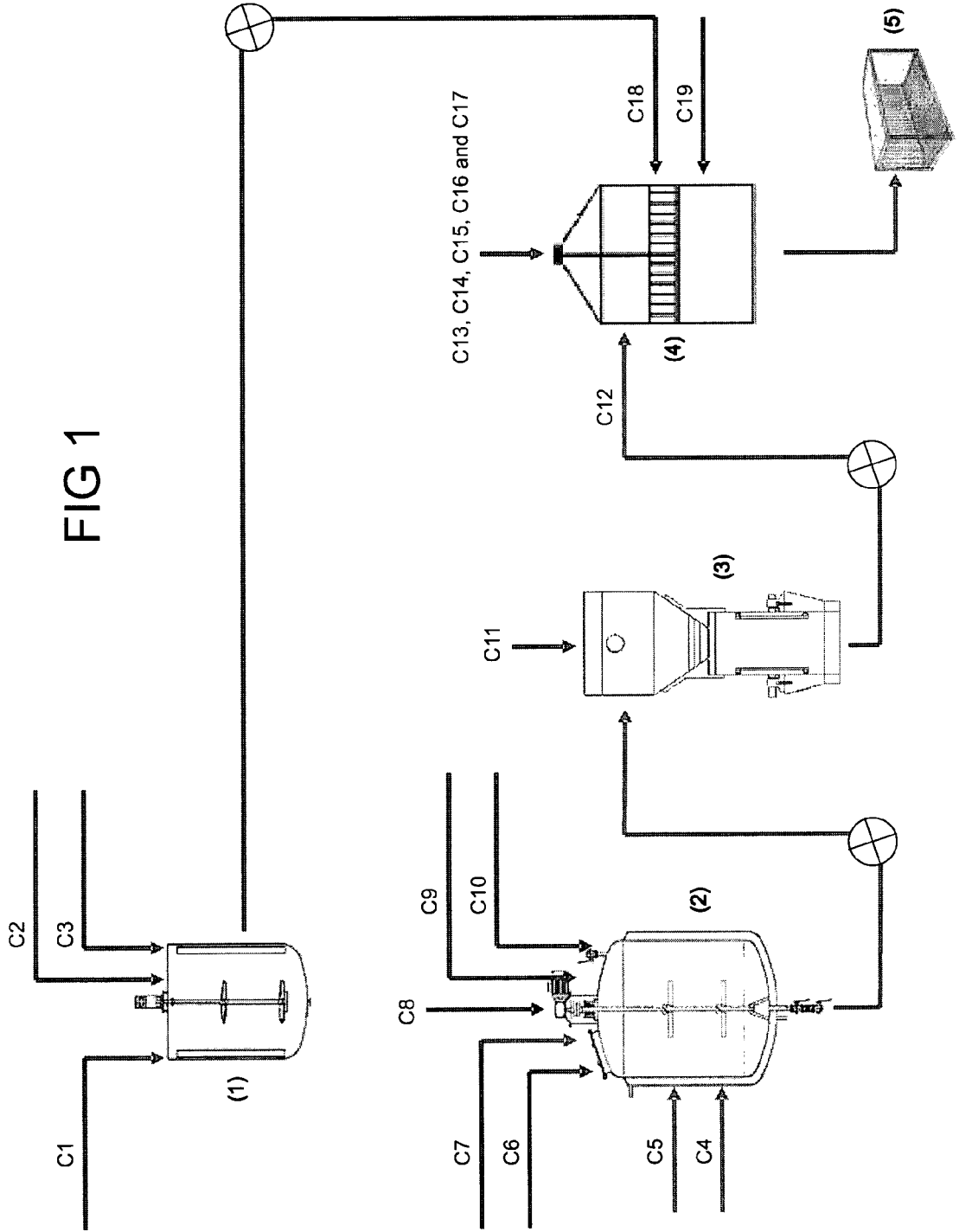
FIG. 1 shows a flow chart of the process of preparing the mono-component formulation.

I—Process for Manufacturing the Mono-Component Formulation (See FIG. 1)

In the process for preparing the mono-component formulation (which may also be prepared in the form of paint and varnish) it is necessary to prepare the primary binding component and a pigment paste previously. In parallel to this preparation, one formulates the base paste. The preparation steps of the process are detailed hereinafter:

Preparation of the Primary Binding Component (Pre-Polymer) [PHASE 1]

1. In a reactor provided with a stirrer, add 0.2-0.5 parts of ratioequivalent to OH/NCO of one of more polymers containing hydroxyl groups;
2. under stirring of 425 rpm, add to the same reactor 1 part of isocyanate containing polyisocianate groups together with 1-3% by weight of acid (for example, acetyl chloride or benzoyl chloride), to maintain the stability of the system;
3. after stirring for about 20-30 minutes at room temperature (25-30° C.) at 425 rpm;
4. the reaction is conducted in an inert atmosphere and in the absence of water;
5. raise the temperature to 100° C., for 1 hour;
6. this preparation results in the pre-polymer of the mono-component formulation with excess of free NCO.

Preparation of the Pigment Paste 1.1 in a tank provided with a disperser, add sequentially, under stirring: 1700:
30 to 50% pigment;

28 to 50% aromatic hydrocarbon (solvent);
2 to 4% dispersants;
0.4 to 0.7% anti-foaming or de-aerating agent;
15 to 25% grinding carrier (plant oil);
1 to 2% hygroscopic agent; and
maintain this mixture under stirring for another 30 minutes; 1.2 Pass the mixture obtained in the previous step through a ball mill until 7-hegmans fineness is achieved;

Preparation of the Paste (PHASE 2):

1a. in a tank provided with a dispersor, add 15 to 25% by weight of a mixture of solvents selected from esters, hydrocarbons, aromatics, acetates and ketonics, which present each 5 moisture content 0.2% (ratio of the mixture of solvents: 40% hydrocarbon:20% acetate:30% ester:10% ketonics;

2a. under stirring of 1700 rpm, add to the same tank 3 to 5% (solution at 10% by weight of solvent) rheologic additive, 0.4-0.6% by weight of dispersant, 0.3-0.6% by weight of anti-foaming or de-aerating agent, and 0.3-0.6% by weight of wetting agent;

3a. add, under stiring of 1700 rpm, 7-12% by weight of mineral fillers (silicate:carbonate ratio being 70%:30%) and 10-15% by weight of the pigment paste (obtained in step 1.2), until a paste is formed;

4a. pass the paste obtained in the preceding step through a ball mill three times;

5a. wash the mill with the remaining solvent (about 5-10% by weight of the amount used in step 1a) and add it to the paste;

6a. add the paste to a hermetically closed tank with inert atmosphere;

7a. further under stirring at 425 rpm, add the surface-activity additives: 2-4% by weight of fluorinated polymer of PTFE and 1-3% by weight of hydroxyl alkyl polydimethylsyloxane resin (which may be wholly or partly substituted with functional acrylic polydimethylsyloxane or modified polyether); 1-3% by weight of an agent that provides self-cleaning: fluorochemical; and 1-4% of an anti-incrustation, antifungal and moss/slime/algae inhibiting agent;

8a. the addition of 5-10% by weight of a frosting agent and 0.5-1.5% by weigh of an ultraviolet protection agent at this step of the process is optional;

9a. under slow stirring (425 rpm), add the pre-polymer obtained in step 6 of PHASE 1 (mixture ratio (PHASE 1):(PHASE 2) being (35%-45%):(55%-60%), further mix under stirring until complete homogenization is achieved;

10a. add 1-2% by weight polyfunctional isocyanate as moisture absorbent;

11a. the thus obtained mono-component formulation is subsequently packed into a suitable container for commercialization.

I.I=Process for Preparing a Varnish—Mono-Component (See FIG. 2)

For the preparation of a varnish, the step of preparing the primary binding component (pre-polymer) [PHASE 1] is repeated. However, the following steps are necessary to obtain the preparation of the [PHASE 2A]:

Preparation of the Primary Binding Component (Pre-Polymer) PHASE 1

1. in a reactor provided with a stirrer, add 0.2-0.5% of parts of ratio equivalent to OH/NCO of one or more polymers containing hydroxyl groups;
2. under stirring at 425 rpm, add to the same reactor 1 part of isocyanate containing polyisocyanate groups together with 1-3% by weight acid (for example, acetyl chloride and/or benzoyl chloride), to maintain the stability of the system:
3. after mixing for about 20-30 minutes at room temperature (25-30° C.) at 425 rpm;
4. the reaction is conducted in inert atmosphere and in the absence of water;
5. raise the temperature to 100° C. for 1 hour;
6. this preparation results in the pre-polymer of the mono-component formulation with excess of free NCO;
7. transfer the mixture to an inert-atmosphere mixer.

Preparation of the [PHASE 2A)

1b. in the mixer with inert atmosphere containing the pre-polymer obtained in step 6, add 18-30% by weight of a mixture of solvents selected from esters, hydrocarbons, aromatics, acetates and ketonics, each exhibiting moisture content≤0.2% (ratio of the mixture of solvent: 40% hydrocarbon:20% acetate:30% ester; 10% ketonics);

2b. Under stirring at 425 rpm, first add 0.3-0.6% by weight of the anti-foaming or de-airing additive; 0.4-0.6% of wetting agent and then 2-4% by weight of fluorate polymer of PTFE and 1-3% by weight of hydroxyl alkyl polydimethylsyloxane resin (which may be wholly or partly substituted with functional acrylic polydimethylsyloxane or modified polyether; 1-3% of a fluorochemical; 2-4% of anti-incrustation, antifungal and moss/slime/algae inhibiting agent; and 1-2% of a hygoscopic agent (polyfunctional isocyanate);

3b. the addition of 5-10% by weight of a grosting agent and 0.5-1.5% by weight of ultraviolet protection agent in this process step is optional;

4b. pass the varnish from step 2b (or step 3b, as the case may be) through a 120-μm filter to retain possible impurities absorbed in the process;

5b. the thus obtained varnish is then packed in a suitable container for commercialization.

II—Process of Making the Bi-Component Formulation (See FIG. 3)

The bi-component formulations (which may be presented in the form of pain, varnish and water-emulsified base) comprise the following components A and B, besides the pigment paste. The steps of preparing each of these components are detailed hereinafter:

Preparation of the Pigment Paste 1.1c. in a tank provided with a disperser, add sequentially, under stirring of 1700 rpm:
30-50% pigment,
28-50% aromatic hydrocarbon (solvent),
2-4% dispersants,
0.4-0.7% anti-foaming or de-aerating agent,
15-25% grinding carrier (short-chain alquidic resin in plant oil or hydroxylated acrylic resin),
and keep this mixture under stirring for another 30 minutes;

1.2c. pass the mixture obtained in the preceding step through a ball mill until fineness of 7 hegmans is achieved.

Preparation of Component A 1c. in a tank provided with a disperser, under rotation of 1700 rpm, add 4-15% by weight of a mixture of solvents (obtained through the following mixture: 40% hydrocarbon: 20% acetate:30% ester:10% ketonics), together with 3-5% (solution at 10% by weight of solvent) rheological additive;

2c. raise the stirring of the mixture from step 1c to 1700 rpm for 10 minutes;

3c. add 0.4-0.6% by weight of dispersant, 0.3-0.6% by weight of anti-foaming or de-aerating agent, and 0.4-0.6% by weight of wetting agent;

4c. still stirring at 1700 rpm, add then 5-10% by weight of a mixture of mineral fillers (obtained through the following mixture: 50% silicate:30% calcium carbonate:20% magnesium carbonate;

5c. keep under stirring at 1700 rpm for 25 minutes, for complete dispersion of the mineral fillers;
6c. add slowly 30-40% polyester derived from PET (polyethylene therephthalate (optionally polyester derived from PET 20% in combination with 80% hydroxylated acrylic resin containing OH groups and aliphatic polyisocyanate catalysts 60-80% with 10-40% of aromatic polyisocyanate);
7c. add 1-3% of the plasticizer, keeping the stirring at 1700 rpm for another 5 minutes;
8c. add to step 7c about 10-15% of the pigments obtained in the pigment paste of step 1.2c;
9c. mix the solution obtained in the preceding step to ¼ of the initial rotation, pass the same mixture through a ball mill and immediately lead it to the tank;
10c. add the rest of the solvents (about 20% by weight of the amount used in step 1c) through the ball mill to wash it and decrease loss, and equally lead the wash solution obtained to the tank containing the formulation of step 9c, for the purpose of adjusting the viscosity (if necessary, add solvent to achieve the desired viscosity (adjustment of the solution);
11c. add the following surface-activity additives: 1-3% hydroxyl alkyl pro-pyldimethylsyloxane resin (which may be wholly or partly substituted with functional acrylic polydimethylsyloxane or modified polyether; 2-4% fluorinated polymer of PTFE, 1-2% of fluorochemical and 2-4% of anti-incrustation, antifungal agent and inhibitor of the formation of moss, slime and algae;
12c. mix until complete homogenization is achieved;
13c. the addition of 5-10% of frosting agent and 0.5-1.5% by weight of ultraviolet protection agent is optional.

Preparation of Component B
1d. fractionating component 2.4 toluene isocyanate or 2.6 toluene diisocyanate;
2d. adding, in package, in schoichiometric proportion of: 3 component A: 1 component B;
3c. in step 2d, further adding an excess of about at most 25% by weight of component B.

II.I—Process for Preparing a Varnish—Bi-Component (See FIG. 4)

For preparation of bi-component formulations in the form of varnish, individual preparation of components A and B is necessary. The steps of preparing each of these components are detailed hereinafter:

Preparation of Component A
1c. in a tank provided with a disperser, under stirring of 425 rpm, add 15-25% by weight of a mixture of solvents (obtained through the following mixture: 40% hydrocarbon: 20% acetate:30% ester:10% ketonics);
2c. add 0.3-0.6% by weight anti-foaming or de-aerating agent and 0.3-0.6% by weight of wetting agent;
3c. further under stirring of 425 rpm until complete homogenization is achieved;
4c. slowly add 35-45% of polyester derived from PET (polyethylene therephthalate);
5c. add the following surface-activity additives: 1-3% of hydroxyl alkyl polydimetylsyloxane resin (which may be wholly or partly substituted with functional acrylic polydimethylsyloxane or modified polyether; 2-4% fluorinated polymer from PTFE, 1-3% fluorochemical and 2-4% of anti-incrustation, antifungal and moss/slime/algae-formation inhibiting agent;
6c. mixing until complete homogenization is achieved;
7c. the addition of 5-10% of frosting agent and 0.5-1.5% by weight of ultra-violet protection agent is optional;
8c. pass the varnish from step 6c (or 7c, as the case may be) through a 120-µm filer for retention of possible impurities absorbed in the process;
9c. the thus obtained varnish is then packed in a suitable container for commercialization.

Preparation of Component B
1d. fractionating component 2.4 toluene isocyanate or 2.6 toluene diisocyanate;
2d. adding in package in stoichiometric proportion of: 3 component A: 1 component B.
3d. in step 2d, further adding an excess of about, at most, 25% by weight of the component B.

II.II—Process for Preparing the Water-Emulsified Bi-Component Formulation (See FIG. 5)

In the bi-component formulations in the form of water-emulsified base, the individual preparation of components A, B and the pigment paste is necessary. The steps of preparing each of these components are detailed hereinafter.

Preparation of the Pigment Paste
1.1c. in a tank provided with a disperser, add sequentially under stirring of 1700 rpm:
40 to 60% pigment;
25 to 35% deionized water;
2 to 4% dispersants;
0.4 to 1% anti-foaming or de-aerating agent; and
15 to 25% of a grinding carrier (carboxylated resin);
and keep this mixture under stirring for another 30 minutes;
1.2c. pass the mixture obtained in the preceding step through a ball mill until fineness of 7 hegmans is achieved;

Preparation of Component A
1e. in a tank provided with a disperser, under stirring of 1700 rpm, add 10 to 20% by weight of deionized water and then add 0.1 to 0.8% by weight of rheological additive and keep the stirring for 25 minutes;
2e. still under stirring of 1700 rpm, add 0.4-0.8% by weight of a dispersing agent, 0.3-0.6% by weigh of an antifoaming agent and 1-2% of surfactant;
3e. add 6-12% by weight of a mixture of mineral fillers (obtained through the mixture ratio: 40% calcium (or magnesium) carbonate:15% talc:35% silicate) and keep the stirring for another 20 minutes; 4e. add 25-40% by weight of the dispersion of an aliphatic urethane polymer (50% water:50% polymer) containing hydroxyl groups and than add 8-15% by weight of the acrylic resin in emulsion (50% water:50% of the resin) and keep stirring for another 10 minutes;
5e. reduce the stirring to ¼ of rpm and add 2-4% by weight of hydroxyl alkyl prolydimethylsyoxane modified resin; 1-3% by weight of fluorochemical and 2-4% by weight of anti-incrustation agent;
6e. add 8-15% by weight of pigment paste.

Preparation of Component B
1f. fractionating the polyisocyanate hydrophilic component containing NCO groups;
2f. packing in a suitable package in stoichiometric proportion of: 4 component A: 1 component B.

EXAMPLES

The illustrative examples presented hereinafter will serve to describe the present invention in a better manner. However, the formulations described merely refer to some embodiments of the present invention and should not be taken as being limitative of the scope thereof.

All the percentages indicated in the examples are percentages by weight, based on the total weight of the formulation.

Example 1

Mono-component Formulation

| Ingredient | Function in the formulation | Amount (% by weight) |
|---|---|---|
| Pigment paste | | |
| Mineral, metallic and organic pigment | Pigment | 30-50 |
| Aromatic hydrocarbons | Solvent | 28-50 |
| Mineral oil derivative | Dispersing agent | 2-4 |
| Vinyl polymer, mineral oil or silicone | Anti-foaming or deaerating agent | 0.4-0.7 |
| Plant oil | Grinding carrier | 15-25 |
| Polyfunctional isocyanate | Hygroscopic agent | 1-2 |
| [PHASE 2] | | |
| Esters, ketonics and aromatic hydrocarbons and acetates | Solvent | 15-25 |
| Clay (bentone) | Rheological agent | 3-5 |
| Mineral oil derivative | Dispersing agent | 0.4-0.6 |
| Vinyl polymer, mineral oil or silicone | Anti-foaming or deaerating agent | 0.3-0.6 |
| Multifunctional silicone, mineral oil or sodium polyacrylate | Wetting agent | 0.3-0.6 |
| Carbonates, talcs and silicates | Mineral filler | 7-12 |
| Pigment paste | Pigment | 10-15 |
| Fluorinated polymer from PTFE | Surface-activity additive | 2-4 |
| Hydroxyl alkyl polydimethylsyloxane resin (which may be wholly or partly substituted with functional acrylic polydimethylsyloxane or modified polyether; | Surface activity additive | 1-3 |
| Fluorochemical | Agent that provides self-cleaning | 1-3 |
| MX 500 ® | Anti-incrustation, antifungal and moss/slime/algae inhibiting agent | 2-4 |
| Pyrogenated silicas and polyethylene waxes (optional) | Frosting agent | 5-10 |
| TINUVIN ® (optional) | Ultraviolet protection agent | 0.5-1.5 |
| Polyfunctional isocyanate | Hygroscopic agent | 1-2 |
| PHASE 1 | Pre-polymer | 35-45 |

Example 2

Varnish Formulation—Mono-component

| Ingredient | Function in the formulation | Amount (% by weight) |
|---|---|---|
| Esters, ketonics and aromatic hydrocarbons and acetates | Solvent | 18-38 |
| Vinyl polymer, mineral oil or silicone | Anti-foaming or deaerating agent | 0.3-0.6 |
| Multifunctional silicone, mineral oil or sodium polyacrylate | Wetting agent | 0.4-0.6 |
| Fluorinated PTFE polymer | Surface activity additive | 2-4 |
| Hydroxyl alkyl polydimethylsyloxane resin (which may be wholly or partly substituted with functional acrylic polydimethylsyloxane or modified polyether) | Surface activity additive | 1-3 |
| Fluorochemical | Agent that provides self-cleaning | 1-3 |
| MX 500 ® | Anti-incrustation, antifungal and moss/slime/algae inhibiting agent | 2-4 |
| Polyfunctional isocyanate | Hygroscopic agent | 1-2 |
| Pyrogenated silicas and polyethylene waxes (optional) | Frosting agent | 5-10 |
| TINUVIN ® (optional) | Ultraviolet protection agent | 0.5-1.5 |
| PHASE 1-primary binder | Pre-polymer | 40-65 |

Example 3

Bi-component Formulation

| Ingredient | Function in the formulation | Amount (% by weight) |
|---|---|---|
| Pigment paste | | |
| Mineral, metallic and organic pigment | Pigment | 30-50 |
| Aromatic hydrocarbons | Solvent | 28-50 |
| Mineral oil derivative | Dispersing agent | 2-4 |
| Vinyl polymer, mineral oil or silicone | Anti-foaming or deaerating agent | 0.4-0.7 |
| Short-chain alquidic resin in plant oil or hydroxylated acrylic resin | Grinding carrier | 15-25 |
| Component A | | |
| Esters, ketonics and aromatic hydrocarbons and acetates | Solvent | 4-15 |
| Clay (bentone) | Rheological agent | 3-5 |
| Mineral oil derivative | Dispersing agent | 0.4-0.6 |
| Vinyl polymer, mineral oil or silicone | Anti-foaming or deaerating agent | 0.3-0.6 |
| Multifunctional silicone, mineral oil or sodium polyacrylate | Wetting agent | 0.4-0.6 |
| Carbonates, talcs and silicates | Mineral filler | 5-10 |
| Polyester derived from PET | Film forming agent | 30-40 |
| Chlorinated paraffin and/or castor oil | Plasticizer | 1-3 |
| Pigment paste | pigment | 10-15 |
| Hydroxyl alkyl polydimethylsyloxane resin (which may be wholly or partly substituted with functional acrylic polydimethylsyloxane or modified polyether;) | Surface activity additive | 1-3 |
| Fluorinated polymer from PTFE | Surface activity additive | 1-3 |
| Fluorochemical | Agent that provides self-cleaning | 1-3 |

| Ingredient | Function in the formulation | Amount (% by weight) |
| --- | --- | --- |
| MX 500 ® | Anti-incrustation, antifungal and moss/slime/algae inhibiting agent | 2-4 |
| Pyrogenated silicas and polyethylene waxes (optional) | Frosting agent | 5-10 |
| TINUVIN ® (optional) | Ultraviolet protection agent | 0.5-1.5 |
| 2,4 toluene isocyanate or 2,6 toluene diisocyanate | Component B- curing agent | 18-28 |

Example 4

Varnish Formulation—Bi-component

| Ingredient | Function in the formulation | Amount (% by weight) |
| --- | --- | --- |
| Esters, ketonics and aromatics hydrocarbons and acetates | Solvent | 15-25 |
| Vinyl polymer, mineral oil or silicone | Anti-foaming or deaerating agent | 0.3-0.6 |
| Multifunctional silicone, mineral oil or sodium polyacrylate | Wetting agent | 0.3-0.6 |
| Polyester derived from PET | Film forming agent | 35-45 |
| Hydroxyl alkyl polydi-methylsyloxane resin (which may be wholly or partly substituted with functional acrylic polydi-methylsyloxane or modified polyether;) | Surface activity additive | 1-3 |
| Fluorinated polymer from PTFE | Surface activity additive | 2-4 |
| Fluorochemical | Agent that provides self-cleaning | 1-3 |
| MX 500 ® | Anti-incrustation, antifungal and moss/slime/algae inhibiting agent | 2-4 |
| Pyrogenated silicas and polyethylene waxes (optional) | Frosting agent | 5-10 |
| TINUVIN ® (optional) | Ultraviolet protection agent | 0.5-1.5 |
| 2,4 toluene isocyanate or 2,6 toluene diisocyanate | Component B- curing agent | 20-30 |

Example 5

Bi-Component Formulation—Water-emulsified Base

| Ingredient | Function in the formulation | Amount (% by weight) |
| --- | --- | --- |
| Pigment paste | | |
| Mineral and organic pigment | Pigment | 40-60 |
| Deionized water | Dissolution carrier | 25-35 |
| Sodium polyacrylate | Dispersing agent | 2-4 |
| Vinyl polymer | Anti-foaming or deaerating agent | 0.4-1 |
| Carboxylated resin | Grinding carrier Component A | 15-25 |
| Deionized water | Dissolution agent | 10-20 |
| Bentonite | Rheological additive | 0.1-0.8 |
| Polyacrylic acid sodium salt | Dispersing agent | 0.4-0.8 |
| Vinyl polymer | Anti-foaming or deaerating agent | 0.3-0.6 |
| Acetylene glycol | Surfactant | 1-2 |
| Carbonates, talcs and silicates | Mineral filler | 6-12 |
| Dispersion of aliphatic urethane resin | Film forming agent | 25-40 |
| Acrylic resin in emulsion | Film forming agent | 8-15 |
| Pigment paste | Pigment | 8-15 |
| Modified hydroxyl alkyl polydimethylsyloxane resin (which may be wholly or partly substituted with functional acrylic polydi-methylsyloxane or modified polyether) | Surface activity additive | 2-4 |
| Fluorochemical | Agent that provides self-cleaning | 1-3 |
| MX 500 ® | Anti-incrustation, antifungal and moss/slime/algae inhibiting agent | 2-4 |
| Hydrophilic polyisocyanate | Component B- curing agent | 12-20 |

The invention claimed is:

1. A bi-component formulation comprising component A and component B, wherein:
    said bi-component formulation is a paint;
    the stoichiometric proportion of component B to component A is at least 3:1;
    the component A comprises:
    i. 4 to 15% by weight of a solvent selected from the group consisting of an ester, a ketone, an aromatic hydrocarbon, an acetate, and mixtures thereof,
    ii. 3 to 5% by weight of a rheological additive, which is a modified clay,
    iii. 0.4 to 0.6% by weight of a dispersing agent, wherein the dispersing agent is a mineral-oil derivative,
    iv. 0.3 to 0.6% by weight of an antifoaming or de-aerating agent selected from the group consisting of vinyl polymer, mineral oil, silicone and mixtures thereof,
    v. 0.4 to 0.6% by weight of a wetting agent selected from the group consisting of multifunctional silicone, mineral oil, sodium polyacrylate and mixtures thereof,
    vi. 5 to 10% by weight of a mineral filler selected from the group consisting of calcium carbonate, magnesium carbonate, magnesium silicate, and mixtures thereof,
    vii. 30 to 40% by weight of a film forming agent, which is a polyester derived from polyethylene therephthalate (PET),
    viii. 1 to 3% by weight of a plasticizer is selected from the group consisting of castor oil, chlorinated paraffin and mixtures thereof,
    ix. 10 to 15% by weight of a pigment paste having a fineness of 7 hegmans and comprising:

30 to 50% by weight of a pigment selected from the group consisting of mineral, metallic, organic pigments and mixtures thereof, 28 to 50% by weight of a solvent selected from the group consisting of an ester, a ketone, an aromatic hydrocarbon, an acetate, and mixtures thereof, 2 to 4% by weight of a dispersing agent, wherein the dispersing agent is a mineral-oil derivative, 0.4 to 0.7% by weight of an antifoaming or de-aerating agent selected from the group consisting of vinyl polymer, mineral oil, silicone and mixtures thereof, 15 to 25% by weight of a grinding carrier selected from the group consisting of short chain alquidic resin in plant oil and hydroxylated acrylic resin, x. 1 to 3% by weight of a first surface activity additive, which is hydroxyl alkyl pro-pyldimethylsyloxane resin which may be wholly or partly substituted with functional acrylic polydimethylsyloxane or modified polyether, xi. 2 to 4% by weight of a second surface activity additive, which is polytetrafluorethylene, xii. 1 to 2% by weight of an agent that enables self-cleaning, which is fluorochemical, and xiii. 2 to 4% by weight of an anti-incrustation, antifungal and moss/slime/algae-formation inhibiting agent is a mixture of plant extracts, isothiazoline, mineral oils, cationic surfactants and glycol; and the component B is selected from the group consisting of 2,4 toluene isocyanate, 2,6 toluene diisocyanate and mixtures thereof.

2. The bi-component formulation according to claim 1, wherein said component A further comprises one or more of 5 to 10% by weight of a frosting agent selected from the group consisting of silicon dioxide, polyethylene waxes and mixtures thereof; and 0.5 to 1.5% by weight of an ultraviolet protection agent.

3. The bi-component formulation according to claim 1, wherein said component A further comprises 0.5 to 1.5% by weight of 2(2-hydroxy-3,5-bis(1,1-dimethylbenzyl) phenyl) benzotriazole as an ultraviolet protection agent.

4. A bi-component formulation comprising component A and component B, wherein:

said bi-component formulation is a varnish;
the schoichiometric proportion of component B to component A is at least 3:1;
the component A comprises:
  i. 15 to 25% by weight of a solvent selected from the group consisting of an ester, a ketone, an aromatic hydrocarbon, an acetate, and mixtures thereof,
  ii. 0.3 to 0.6% by weight of antifoaming or de-aerating agent selected from the group consisting of vinyl polymer, mineral oil, silicone and mixtures thereof,
  iii. 0.3 to 0.6% by weight of a wetting agent selected from the group consisting of multifunctional silicone, mineral oil, sodium polyacrylate and mixtures thereof,
  iv. 35 to 45% by weight of a film forming agent, which is a polyester derived from polyethylene therephthalate (PET),
  v. 1 to 3% by weight of a first surface activity additive, which is an hydroxyl alkyl polydimethylsyloxane resin which may be wholly or partly substituted with functional acrylic polydimethylsyloxane or modified polyether,
  vi. 2 to 4% by weight of a second surface activity additive, which is polytetrafluorethylene,
  vii. 1 to 3% by weight of an agent that enables self-cleaning, which is fluorochemical, and
  viii. 2 to 4% by weight of an anti-incrustation, antifungal and moss/slime/algae-formation inhibiting agent is a mixture of plant extracts, isothiazoline, mineral oils, cationic surfactants and glycol; and the component B is selected from the group consisting of 2,4 toluene isocyanate, 2,6 toluene diisocyanate and mixtures thereof.

5. The bi-component formulation according to claim 4, wherein said component A further comprises one or more of 5 to 10% by weight of a frosting agent selected from the group consisting of silicon dioxide, polyethylene waxes and mixtures thereof; and 0.5 to 1.5% by weight of an ultraviolet protection agent.

6. The bi-component formulation according to claim 4, wherein said component A further comprises 0.5 to 1.5% by weight of 2(2-hydroxy-3,5-bis(1,1-dimethylbenzyl) phenyl) benzotriazole as an ultraviolet protection agent.

7. A bi-component formulation comprising component A and component B, wherein:

said bi-component formulation is a water-emulsified base;
the schoichiometric proportion of component B to component A is at least 4:1;
the component A comprises:
  i. 10 to 20% by weight of deionized water,
  ii. 0.1 to 0.8% by weight of a rheological additive, which is a modified clay,
  iii. 0.4 to 0.8% by weight of a dispersing agent selected from the group consisting of sodium polyacrylate, polyacrylic acid sodium salt and mixtures thereof,
  iv. 0.3 to 0.6% by weight of an antifoaming or de-aerating agent, which is vinyl polymer,
  v. 1 to 2% by weight of surfactant, which is glycol acetylene,
  vi. 6 to 12% by weight of mineral filler selected from the group consisting of calcium carbonate, magnesium carbonate, magnesium silicate, and mixtures thereof,
  vii. 25 to 40% by weight of a first film forming agent, which is a dispersion of an aliphatic urethane polymer containing hydroxyl groups,
  viii. 8 to 15% by weight of a second film forming agent, which is an acrylic resin in emulsion,
  ix. 2 to 4% by weight of a surface activity additive, which is hydroxyl alkyl prolydimethylsyoxane modified resin,
  x. 8 to 15% by weight of pigment paste having a fineness of 7 hegmans and comprising:
    40 to 60% by weight of a pigment selected from the group consisting of mineral, metallic, organic pigments and mixtures thereof,
    25 to 35% by weight of deionized water,
    2 to 4% by weight of a dispersing agent selected from the group consisting of sodium polyacrylate, polyacrylic acid sodium salt and mixtures thereof,
    0.4 to 1% by weight of an antifoaming or de-aerating agent, which is vinyl polymer, and
    15 to 25% by weight of a grinding carrier, which is a carboxylated resin;
  xi. 1 to 3% by weight of an agent that enables self-cleaning, which is fluorochemical, and xii. 2 to 4% by weight of an anti-incrustation, antifungal and moss/slime/algae-formation inhibiting agent is a mixture of plant extracts, isothiazoline, mineral oils, cationic surfactants and glycol;

the component B is selected from the group consisting of 2,4 toluene isocyanate, 2,6 toluene diisocyanate and mixtures thereof.

\* \* \* \* \*